Jan. 12, 1937. R. W. WALKER 2,067,555
FRUIT JUICE EXTRACTOR
Filed May 8, 1935
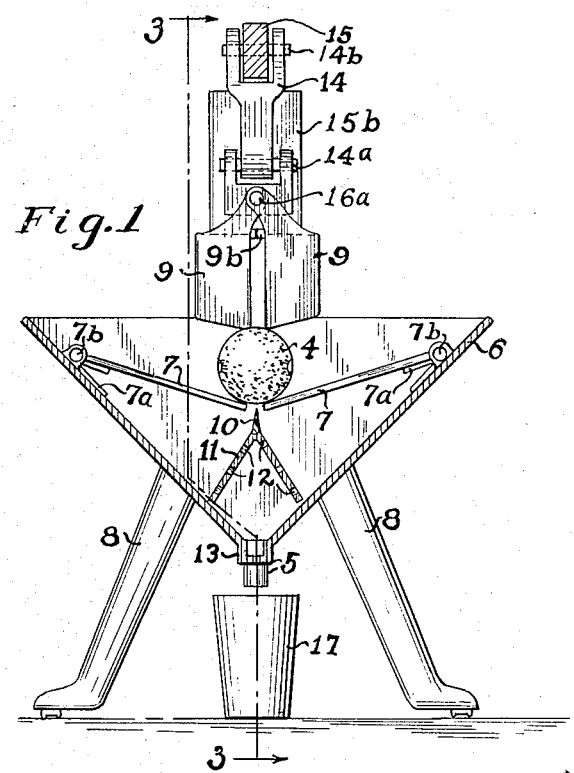
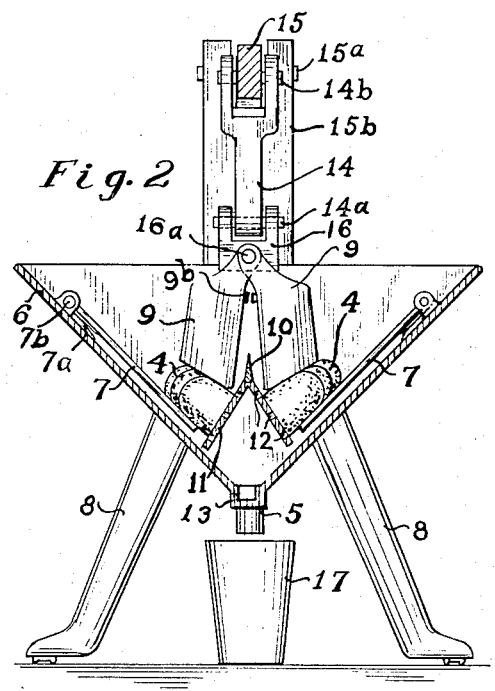
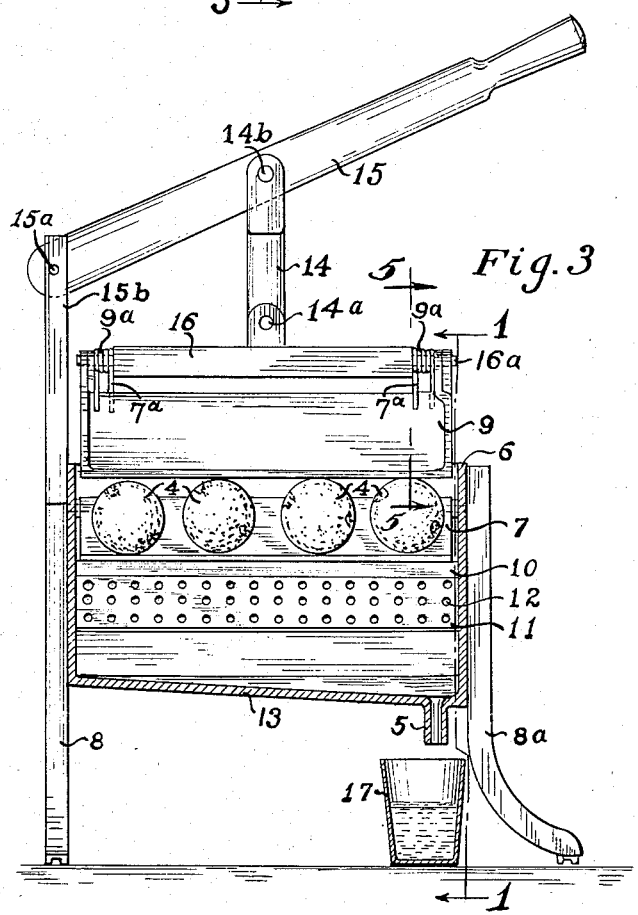
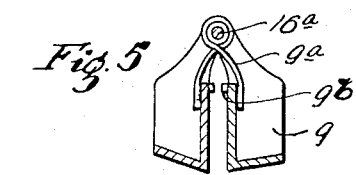
INVENTOR.
Ronald W. Walker
BY Van Buren Hillyard.
ATTORNEY.

Patented Jan. 12, 1937

2,067,555

UNITED STATES PATENT OFFICE 2,067,555

FRUIT JUICE EXTRACTOR

Ronald W. Walker, Megargel, Tex., assignor of one-half to Geraldus W. Warren, Megargel, Tex.

Application May 8, 1935, Serial No. 20,503

3 Claims. (Cl. 100—41)

The invention relates to means for expressing the juice from fruit and provides a device especially adapted for extracting the juice from citrous fruit since it embodies a cutter for severing the skin, a plunger for applying pressure, a lever for conveniently exerting force, a strainer for separating the pulp and seed, and a yieldable support and ejector.

While the drawing illustrates a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which:

Figure 1 is a vertical transverse sectional view of an embodiment of the invention on the line 1—1 of Figure 3, looking to the left, as indicated by the arrows, showing fruit in position preliminary to cutting and pressing.

Figure 2 is a view similar to Figure 1, after the fruit has been cut and pressed.

Figure 3 is a view on the line 3—3 of Figure 1, looking in the direction indicated by the arrows.

Figure 4 is a perspective view of the strainer.

Figure 5 is a detail sectional view of the plungers and the supporting bar therefor on the line 5—5 of Figure 3.

Corresponding and like parts are referred to in the following description and designated in the several views of the drawing by like reference characters.

The device embodies a hopper 6 mounted on legs 8—8a. The sides of the hopper have a synclinal arrangement and merge into a forwardly inclined bottom 13 from the lower end of which depends a spout 5 to direct the juice into a receptacle 17 placed therebelow. A hollow strainer 11 is disposed within the hopper and comprises outwardly and downwardly diverging walls in which are formed openings 12 for the escape of juice. A cutter 10 surmounts the strainer and projects vertically from the line of convergence of the oppositely inclined walls. The strainer and cutter are preferably one and are removable to facilitate cleaning.

Plates 7 are pivoted to the upper portion of the hopper and are held elevated at their inner edges by springs 7a mounted on the pivot pins 7b connecting the plates with the sides of the hopper. The plates 7 are located so as to clear the cutter 10 and sides of the strainer 11 when swung downwardly at their inner edges.

A lever 15 is pivoted at one end to an upright 15b and a link 14 depends therefrom, being pivoted at 14b. Coacting plungers 9 are pivoted, at 16a, to a bar 16 and their lower faces are oppositely inclined laterally and upwardly to maintain contact with the fruit during the juice expressing operation. In the preferred construction, the plungers are of a length to engage several fruit, as shown in Figure 3, but it is obvious from Figure 1, that they may be of a size to act on a single fruit. The ends of the bar 16 are reduced to provide pintles 16a upon which the plungers are mounted. Springs 9a, mounted on the pintles 16a, normally urge the plungers inwardly, the inward movement of the plungers being limited by stops 9b. The bar 16 is in effect a head and is pivoted at 14a to the lower end of the link 14.

In practice, the fruit 4 is placed upon the plates 7 and is positioned above the cutter 10 and below the plungers 9. By depressing the free end of the lever 15 the plungers force the fruit downward. The cutter 10 severs the fruit, the halves being pressed against the sides of the strainer 11. The juice passes through the perforated sides of the strainer into the bottom portion of the hopper 6 and out through the spout 5 into the receptacle 17. The pulp, seeds and rind are separated by the strainer. The fruit is subjected to a wedging action by being pressed into the angular spaces formed between the inclined sides of the strainer and the hopper. Note Figure 2 of the drawing. When the lever 15 is released the plates 7 swing upward by the action of the springs 7a, lifting the pulp, seeds and rind into convenient position for removal by hand. It will thus be understood that the plates 7 perform the dual office of a support for the fruit when placed in position and an ejector for removal of the solid matter after the juice has been expressed therefrom.

Having thus described the invention, what I claim is:

1. A juice extractor comprising a hopper having sides oppositely inclined and meeting to form an apex of the hopper, a cutter above and in line with the apex of the hopper, supporting and elevating plates, each pivoted at its outer edge to the adjacent side of the hopper and each depressible at its inner edge, springs normally supporting the inner edge portions of the plates in elevated position, and plungers for forcing the fruit downwardly and depressing said plates.

2. A juice extractor comprising a hopper having upwardly diverging sides and a bottom outlet, an elongated strainer of inverted V-shape removably supported within the hopper, a cutter surmounting the strainer and carried thereby, plates pivoted to the sides of the hopper and depressible at their inner edges, springs normally holding the inner edges of the plates elevated, and plungers coacting with the plates and strainer.

3. A juice extractor comprising a hopper having upwardly diverging sides and a bottom outlet, an elongated strainer of inverted V-shape removably supported within the hopper, a cutter surmounting the strainer and carried thereby, plates pivoted to the sides of the hopper and depressible at their inner edges, springs normally holding the inner edges of the plates elevated, a bar, plungers pivoted to the bar, springs normally urging the plungers inwardly, an operating lever, and a link connecting the lever with said bar.

RONALD W. WALKER.